(12) United States Patent
Nakata et al.

(10) Patent No.: US 7,866,862 B2
(45) Date of Patent: Jan. 11, 2011

(54) VEHICULAR LAMP

(75) Inventors: Yusuke Nakata, Shizuoka (JP); Michio Tsukamoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 375 days.

(21) Appl. No.: 12/044,157

(22) Filed: Mar. 7, 2008

(65) Prior Publication Data

US 2008/0239744 A1    Oct. 2, 2008

(30) Foreign Application Priority Data

Mar. 26, 2007   (JP) .............................. 2007-080036

(51) Int. Cl.
*B60Q 1/02*   (2006.01)
(52) U.S. Cl. ...................... 362/507; 362/465; 362/517; 362/544
(58) Field of Classification Search ................ 362/227, 362/236, 240, 241, 244, 245, 247, 326, 327, 362/328, 346, 460, 464, 465, 466, 507, 538, 362/539, 543, 544, 545, 800
See application file for complete search history.

(56) References Cited

U.S. PATENT DOCUMENTS

| 6,882,110 | B2 |  | 4/2005 | Ishida et al. |  |
| 7,311,430 | B2 | * | 12/2007 | Tsukamoto et al. | ......... 362/545 |
| 7,387,416 | B2 | * | 6/2008 | Tsukamoto et al. | ......... 362/518 |
| 7,387,417 | B2 | * | 6/2008 | Sazuka et al. | ............... 362/544 |

* cited by examiner

*Primary Examiner*—Hargobind S Sawhney
(74) *Attorney, Agent, or Firm*—Osha • Liang LLP

(57) ABSTRACT

A vehicular lamp forms a low-beam distribution pattern by combining light radiated from a first unit and a second unit. A brightness decreasing element is provided on a reflective surface of a first main reflector in a sub-unit of the first unit. Thus, for the low-beam distribution pattern formed by the first unit and the second unit, among a peripheral end portion of a cut-off line forming pattern formed by the sub unit, a low luminance portion with a partially reduced brightness is formed at the border of both right and left end sides that upwardly overlap with a portion of a diffusion area forming pattern.

12 Claims, 7 Drawing Sheets

VEHICULAR LAMP

BACKGROUND OF INVENTION

1. Field of the Invention

The present invention relates to a vehicular lamp, and more specifically relates to a vehicular lamp that combines light radiated from a plurality of lamp units to form a predetermined light distribution pattern.

2. Related Art

Vehicular lamps must be able to form a high-precision light distribution pattern from a safety standpoint. Such a light distribution pattern is formed by an optical system that uses a reflecting mirror or a lens, for example. Vehicular lamps have also been proposed that combine light radiated from a plurality of lamp units to form a predetermined light distribution pattern (see Patent Document 1 for an example).

For the plurality of lamp units, this kind of vehicular lamp may use the following: a cut-off line forming unit, which radiates light for forming horizontal and oblique cut-off lines of a low-beam distribution pattern; a hot zone forming unit, which radiates light for forming a hot zone of the low-beam distribution pattern; and a diffusion area forming unit, which radiates light for forming a diffusion area of the low-beam distribution pattern. By suitably combining these three types of lamp units, it is possible to obtain a low-beam distribution pattern with a desired pattern formation and light intensity distribution.

A low-beam distribution pattern PL shown in FIG. 9 is a light distribution pattern for driving on the left-hand side, and has horizontal and oblique cut-off lines CL1, CL2 on an upper edge thereof. An elbow point E is set at a position about 0.5 to 0.6 degrees below H-V, which is a vanishing point in a lamp forward direction. A hot zone HZ that is a high light intensity area is formed so as to surround the elbow point E somewhat in the leftward direction. The low-beam distribution pattern PL is formed as a pattern synthesizing a cut-off line forming pattern Pa, a hot zone forming pattern Pb, and a diffusion area forming pattern Pc.

[Patent Document 1] U.S. Pat. No. 6,882,110

SUMMARY OF INVENTION

Combining a plurality of lamp units with different light distribution patterns as with the vehicular lamp described in Patent Document 1 or the like results in a conspicuous border at a peripheral end portion of a light distribution pattern superimposed over other light distribution patterns in order to obtain a synthesized light distribution pattern with a desired pattern formation. This may adversely affect visibility for a driver and contribute to eye fatigue. For example, as shown in FIG. 9, the cut-off line forming pattern Pa is superimposed on the diffusion area forming pattern Pc. The border of the peripheral end portion on both right and left sides of the cut-off line forming pattern Pa is easily visible as a white streak S.

One or more embodiments of the present invention provide a vehicular lamp capable of improving visibility for a driver and increasing safety while employing a plurality of lamp units.

One or more embodiments of the present invention involve a vehicular lamp that combines light radiated from a plurality of lamp units to form a predetermined light distribution pattern. The vehicular lamp is characterized in that at least one lamp unit among the plurality of lamp units forms a light distribution pattern different from that of other lamp units, and among a peripheral end portion of light distribution patterns formed by the respective lamp units, a brightness of a portion upwardly overlapping with another pattern is partially reduced.

It should be noted that a "different light distribution pattern" in the present application also refers to the case where patterns with identical shapes are irradiated at different positions, in addition to the case where patterns are formed with different shapes by the respective lamp units.

According to the vehicular lamp with the above structure, when the light distribution patterns formed by the respective lamp units are synthesized, the brightness of the portion upwardly overlapping with another pattern can be partially reduced. Therefore, a boundary thereof can be made less conspicuous and visibility for a driver can be improved.

Note that in the vehicular lamp with the above structure, it is preferable that the lamp units are respectively provided with a reflector that reflects light from a light source forward, and that among the peripheral end portion of the light distribution pattern, a lamp unit with a partially reduced brightness at a portion upwardly overlapping with another pattern has brightness decreasing means provided on a reflective surface of the reflector.

According to the vehicular lamp with such a structure, the brightness reducing means may be an embossed or knurled structure or a low-reflection coating, which is provided on the reflective surface of the reflector. Such brightness reducing means can easily make the boundary of a portion upwardly overlapping with another pattern less conspicuous.

Also, in the vehicular lamp with the above structure, the lamp unit preferably includes a projection lens that is disposed in front of the reflector and projects light reflected by the reflector forward of a vehicle, and the brightness decreasing means are provided on both right and left end portions of the reflective surface of the reflector.

According to the vehicular lamp with such a structure, when the light distribution patterns formed by the respective lamp units are synthesized, a light distribution pattern projected by the projection lens increases in brightness around a center thereof. Therefore, around the center, the boundary of a portion overlapping with another pattern is less conspicuous. Hence, the brightness decreasing means may be provided only on both the right and left end portions of the reflective surface of the reflector, and it is possible to easily make less conspicuous the boundary of a portion upwardly overlapping with another pattern.

One or more embodiments of the present invention involve a vehicular lamp that combines light radiated from a plurality of lamp units to form a predetermined light distribution pattern. The vehicular lamp is characterized in that at least one lamp unit among the plurality of lamp units forms a light distribution pattern different from that of other lamp units, and among a light distribution pattern formed by the respective lamp units, a brightness of a portion in an outer side vicinity of a portion downwardly overlapping with a peripheral end portion of another pattern is partially increased.

According to the vehicular lamp with the above structure, when the light distribution patterns formed by the respective lamp units are synthesized, the brightness of the portion in the outer side vicinity of the portion downwardly overlapping with the peripheral end portion of another pattern can be partially increased. Therefore, a boundary thereof can be made less conspicuous and visibility for a driver can be improved.

According to the vehicular lamp of the present invention, when the light distribution patterns formed by the respective lamp units are synthesized, the brightness of the portion upwardly overlapping with another pattern can be partially reduced. Therefore, a boundary thereof can be made less conspicuous and visibility for a driver can be improved. It is thus possible to provide a vehicular lamp capable of improving visibility for a driver and increasing safety while employing a plurality of lamp units.

Other aspects and advantages of the invention will be apparent from the following description, the drawings and the claims.

DETAILED DESCRIPTION

Embodiments of a vehicular lamp according to the present invention will be described in detail below with reference to the drawings.

Figure 1:
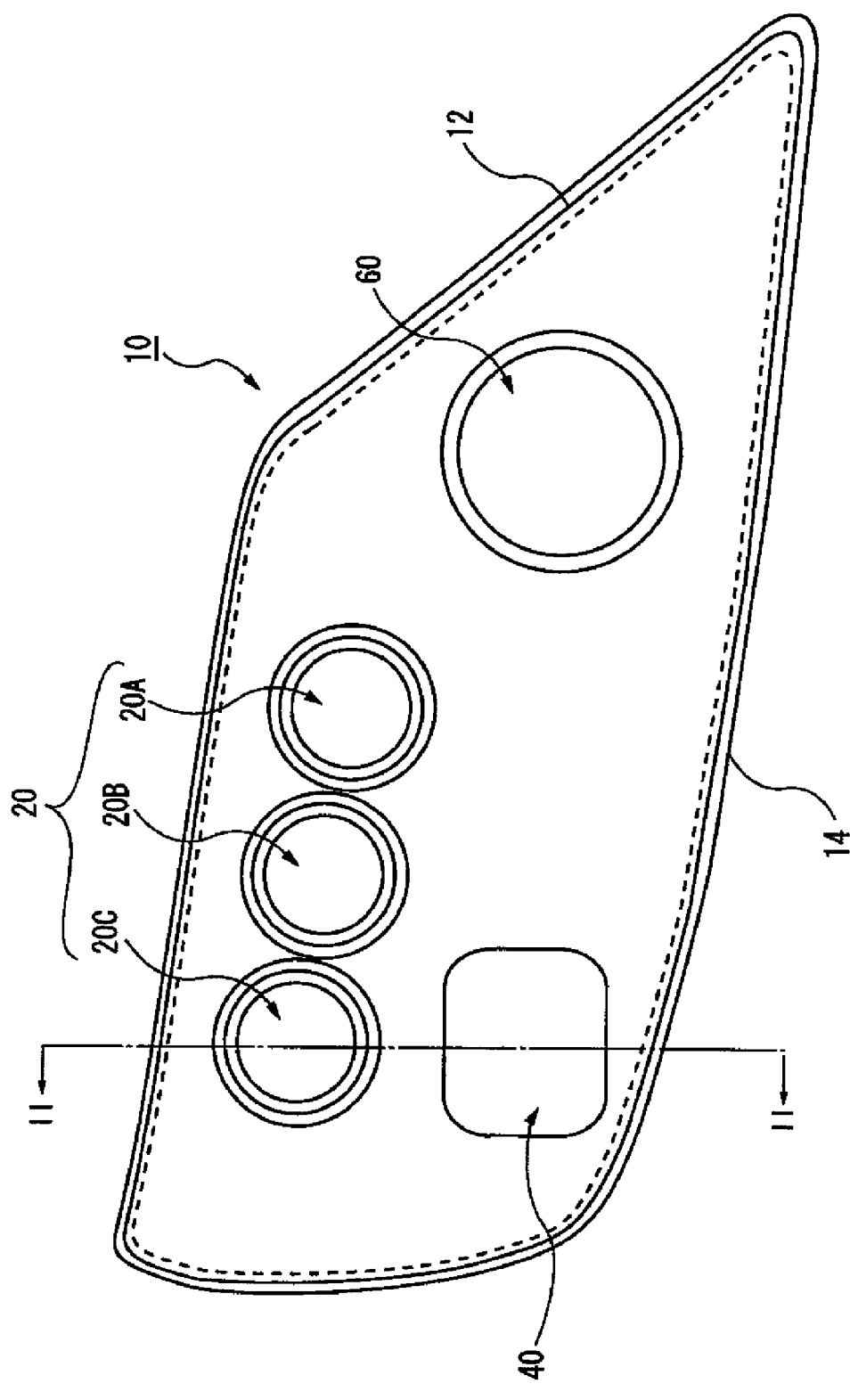
FIG. 1 is a frontal view showing a vehicular lamp according to an embodiment of the present invention.
Figure 2:
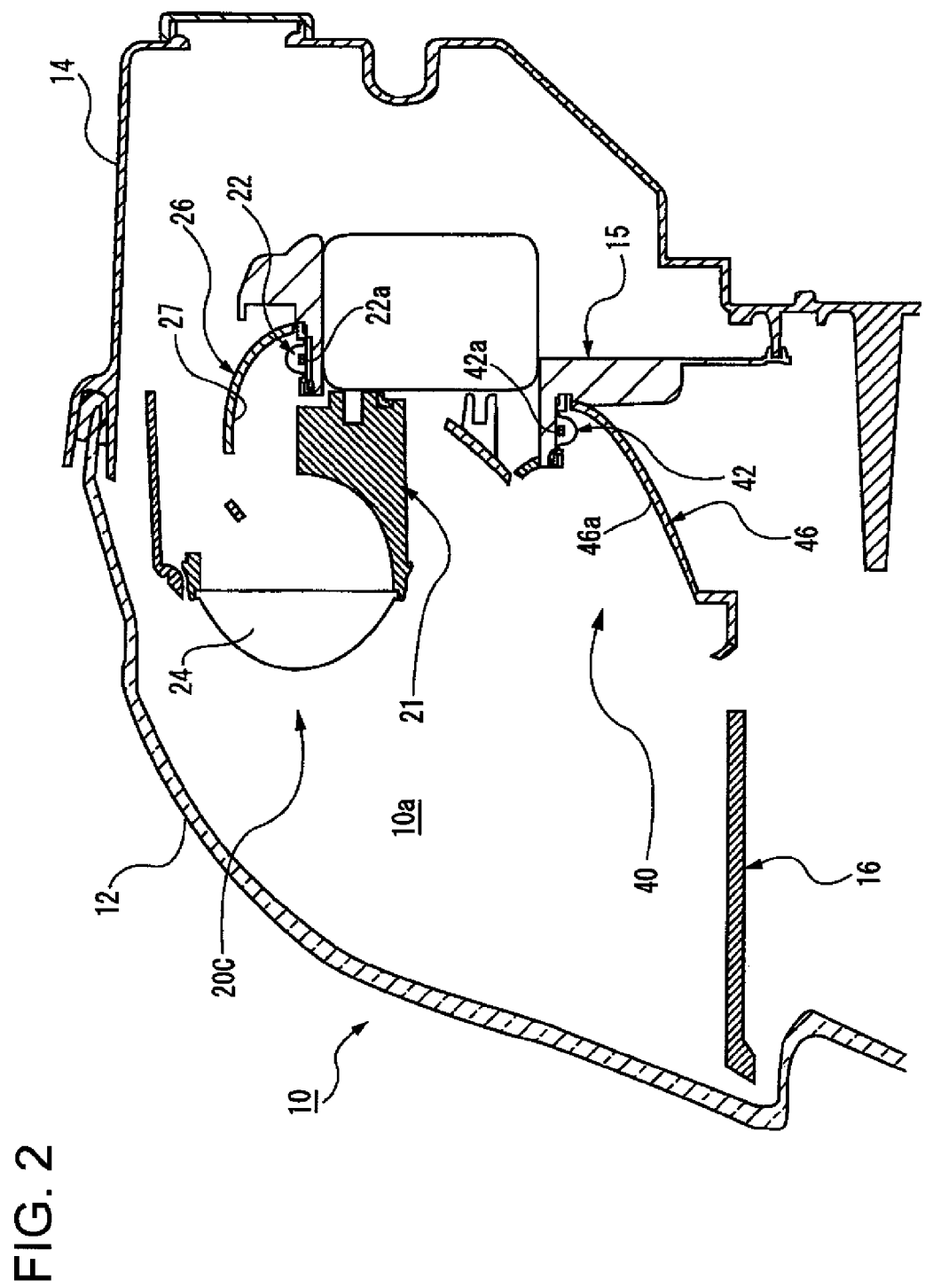
FIG. 2 is a cross-sectional arrow II-II view of the vehicular lamp shown in FIG. 1.
Figure 3:
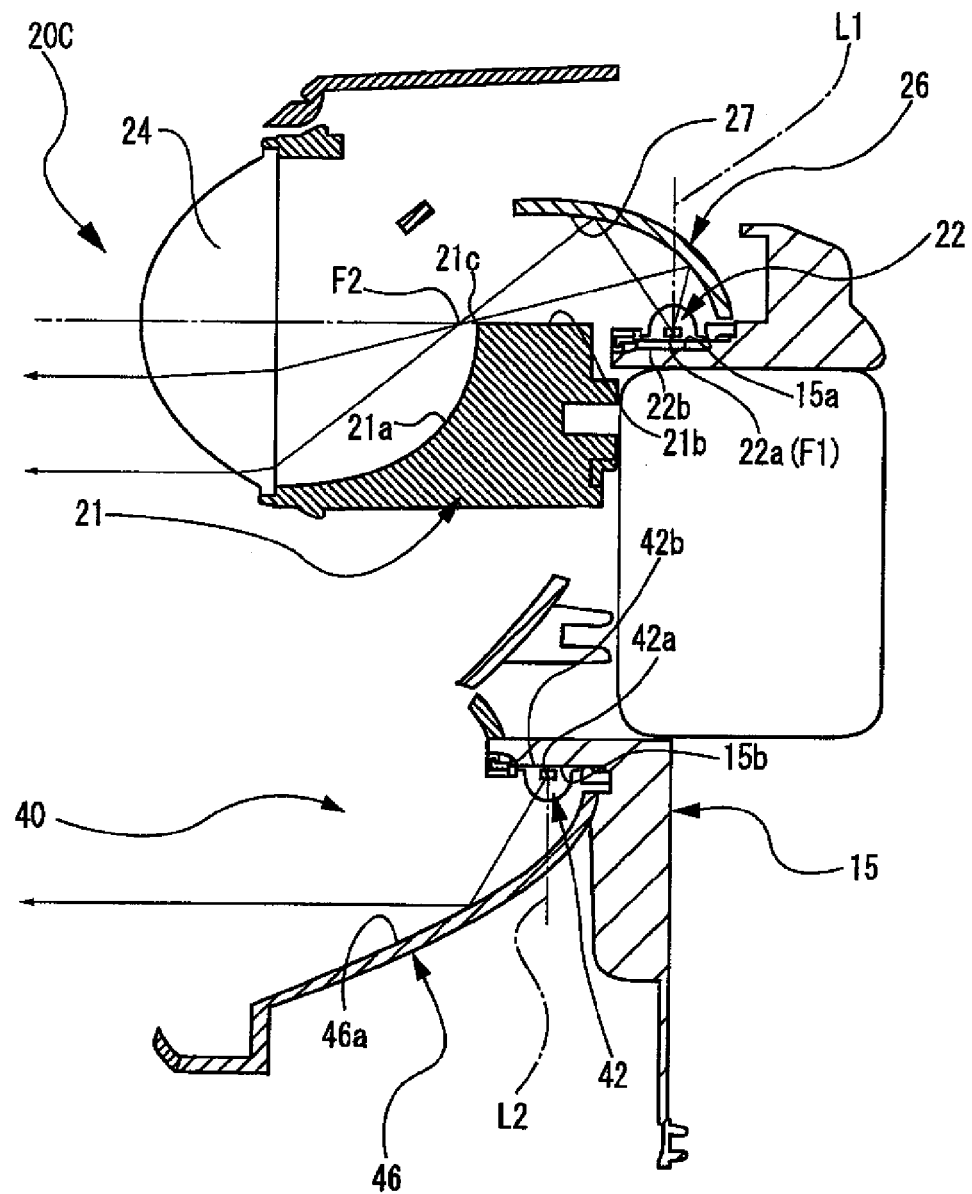
FIG. 3 is an enlarged view of an essential portion of the vehicular lamp shown in FIG. 2.
Figure 4:
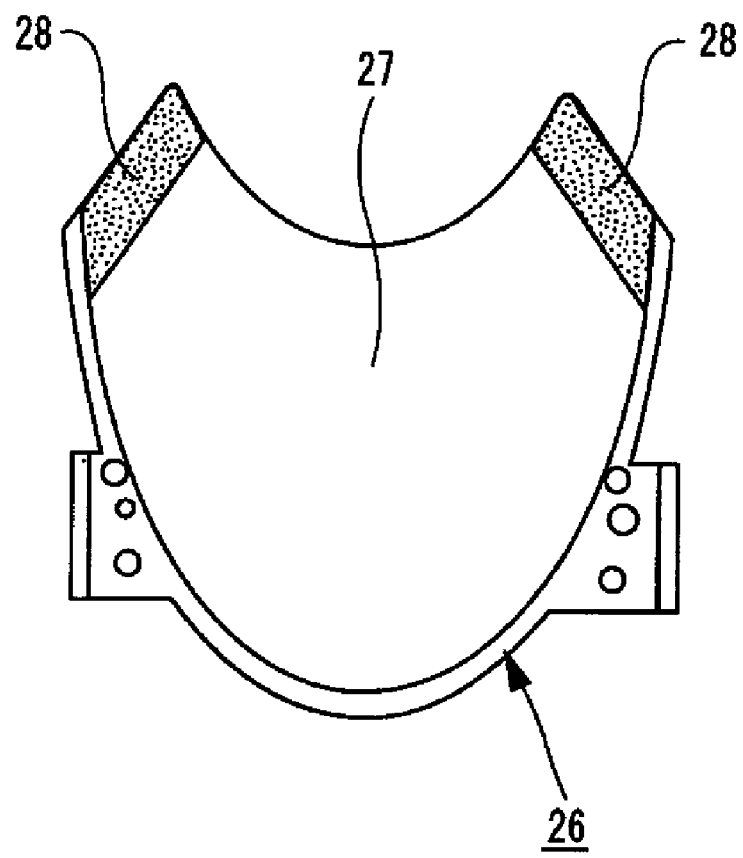
FIG. 4 is a bottom surface view of a reflector in a sub unit 20B shown in FIG. 1.

FIG. 1 is a frontal view showing a vehicular lamp according to an embodiment of the present invention; FIG. 2 is a cross-sectional arrow II-II view of the vehicular lamp shown in FIG. 1; FIG. 3 is an enlarged view of an essential portion of the vehicular lamp shown in FIG. 2; and FIG. 4 is a ray trace view on a horizontal cross section of the sub unit 20B shown in FIG. 1.

A vehicular lamp 10 of one or more embodiments is a headlamp attached to a front end portion of a vehicle, and is capable of selectively turning an upper beam and a low beam on and off. In FIG. 1, a headlamp unit attached to a front right-hand portion of a vehicle such as an automobile is shown as an example of the vehicular lamp 10.

The vehicular lamp 10 has a translucent cover 12 with light transparency and a lamp body 14, as shown in FIGS. 1 and 2. Three light source units (a first unit 20, a second unit 40, and a third unit 60) are inside a lamp chamber 10a, which is surrounded by the translucent cover 12 and the lamp body 14, and fixedly disposed on a support member 15. Also, an extension 16 is disposed between the three light source units 20, 40, 60 and the translucent cover 12 so as to cover a space visible from the front of the lamp.

The support member 15 is fixed to the lamp body 14, and has a support surface 15a and a support surface 15b. The support face 15a is attached with an attachment surface 22b of a first semiconductor light-emitting element (LED) 22, i.e., a first light source of the first unit 20, and the support face 15b is attached with an attachment surface 42b of a second semiconductor light-emitting element LED) 42, i.e., a second light source of the second unit 40. The support member 15 is fixed to the lamp body 14 via a leveling mechanism (not shown), and can adjust optical axes of the respective light source units.

Next, the respective light source units 20, 40, 60 will be described.

The vehicular lamp 10 of one or more embodiments is structured such that a low-beam distribution pattern is formed by combining light radiated from the first unit 20 and the second unit 40, and an upper-beam distribution pattern is formed by light radiated from the third unit 60.

The first unit 20 will be described below first.

The first unit 20 is a light source unit that forms a low-beam distribution pattern PL with the second unit 40 to be described later As shown in FIG. 1, three sub units 20A, 20B, 20C with generally identical structures are respectively provided aligned in a width direction in an installation portion above the support member 15.

Figure 6:
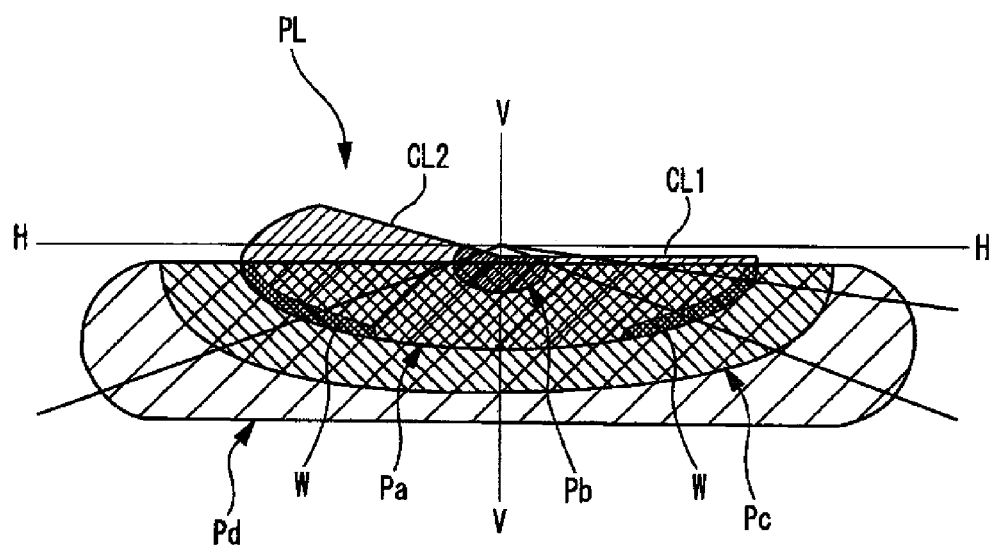
FIG. 6 is a view transparently showing low-beam distribution patterns formed by light that is radiated from the vehicular lamp shown in FIG. 1 onto a virtual vertical screen positioned 25 meters in front of the lamp.

The sub-unit 20A forms a hot zone forming pattern Pb that has horizontal and oblique cut-off lines CL1, CL2 on an upper edge thereof (see FIG. 6). The sub-unit 20B forms a cut-off line forming pattern Pa that is larger than the hot zone forming pattern Pb below the cut-off lines (see FIG. 6). The sub unit 20C forms a diffusion area forming pattern Pc that spreads out more than the cut-off line forming pattern Pa, and overlaps with the hot zone forming pattern Pb and the cut-off line forming pattern Pa below the cut-off lines (see FIG. 6).

As shown in FIGS. 2 and 3, the sub-unit 20c (substantially similar to the sub-units 20A, 20B) includes the first semiconductor light-emitting element 22 that acts as the first light source and is fixedly disposed on the support surface 15a of the support member 15, a first main reflector 26 that reflects light from the first semiconductor light-emitting element 22 forward, a base member 21 that is disposed in front of the support member 15, and a projection lens 24 that is held by the base member 21.

The first semiconductor light-emitting element 22 is a white light-emitting diode with a light-emitting portion (light-emitting chip) 22a that is approximately 1 square millimeter in size. The first semiconductor light-emitting element 22 is also mounted on the support surface 15a of the support member 15 in a state where an illumination axis L1 thereof is oriented upward generally perpendicular to an illumination direction (left direction in FIG. 3) of the sub-unit 20C. It should be noted that the light-emitting portion 22a may be structured so as to be disposed at a slight angle depending on a light-emitting configuration thereof and the distribution of light radiated forward. In addition, a plurality of light-emitting portions (light-emitting chips) may be provided in one semiconductor light-emitting element.

The first main reflector 26 has a vertical cross section with a generally elliptical shape. The first main reflector 26 is a reflective member formed with a reflective surface 27 on an inner side thereof The reflective surface 27 has a free-form surface shape whose horizontal cross section is based on an ellipse. The first main reflector 26 is designed and disposed such that a first focal point F1 thereof is in the vicinity of the light-emitting portion 22a of the first semiconductor light-emitting element 22, and a second focal point F2 thereof is positioned in the vicinity of an edge line 21c formed by a curved surface 21a and a horizontal surface 21b of the base member 21.

Light radiated from the light-emitting portion 22a of the first semiconductor light-emitting element 22 is reflected by the reflective surface 27 of the first main reflector 26, and passes in the vicinity of the second focal point F2 before reaching the projection lens 24. The sub-unit 20C (the sub units 20A, 20B) is structured such that light is partially reflected by the horizontal surface 21b, with the edge line 21c of the base member 21 acting as a border line, and as a consequence, light is selectively cut so as to form an oblique cut-off line on a light distribution pattern projected forward of the vehicle. In other words, the edge line 21c is structured as a light-dark border line of the sub-unit 20C (the sub-units 20A, 20B).

It should be noted that a portion of light reflected by the reflective surface 27 of the first main reflector 26 and further reflected by the horizontal surface 21b of the base member 21 is also preferably radiated forward as effective light. Accordingly, in one or more embodiments, a vehicle front side of the horizontal surface 21b of the base member 21 has an optical configuration whose reflection angle is suitably set in consideration of the positional relationship with the projection lens 24 and the first main reflector 26.

The projection lens 24 is a convex type of aspheric lens that projects light reflected by the reflective surface 27 of the first main reflector 26 forward of the vehicle. The projection lens 24 is fixed in the vicinity of a tip end portion on the vehicle front side of the base member 21. In one or more embodiments, a rearward side focal point of the projection lens 24 is structured so as to generally coincide with the second focal point F2 of the first main reflector 26.

Accordingly, light reflected by the first main reflector 26 and incident to the projection lens 24 is projected forward as generally parallel light. In other words, the sub-units 20A, 20B, 20C of the first unit 20 in one or more embodiments are respectively structured as reflecting projector type light source units for condensed light cut-off formation.

The second unit 40 will be described next.

The second unit 40 is a light source unit that forms a low-beam distribution pattern with the first unit 20 described above, and is disposed below the sub-unit 20C. The second unit 40 forms a larger diffusion area forming pattern Pd that spreads out more than the diffusion area forming pattern Pc formed by the sub-unit 20C of the first unit 20 (see FIG. 6).

As shown in FIGS. 2 and 3, the second unit 40 includes the second semiconductor light-emitting element 42 that acts as the second light source and is fixedly disposed on the support surface 15b of the support member 15, and a second main reflector 46 that reflects light from the second semiconductor light-emitting element 42 forward.

The second semiconductor light-emitting element 42 is a white light-emitting diode with a light-emitting portion 42a, similar to the first semiconductor light-emitting element 22. The second semiconductor light-emitting element 42 is also mounted on the support surface 15b of the support member 15 in a state where an illumination axis L2 thereof is oriented downward generally perpendicular to an illumination direction (left direction in FIG. 3) of the second unit 40.

The second main reflector 46 is a reflective member whose inner side is formed with a reflective surface 46a that uses a general paraboloid of revolution as a reference surface and the vicinity of the light-emitting portion 42a as a focal point. Light radiated from the light-emitting portion 42a of the second semiconductor light-emitting element 42 is reflected by the reflective surface 46a of the second main reflector 46, and irradiated forward of the vehicle. In other words, the second unit 40 in one or more embodiments is structured as a reflective type of light source unit.

The third unit 60 is a light source unit that forms an upper-beam distribution pattern, and includes a third semiconductor light-emitting element (not shown) and a projection lens 64. The third semiconductor light-emitting element acts as a third light source element and is fixedly disposed on the support member 15. The projection lens 64 is a convex type of aspheric lens that projects light radiated from a light-emitting portion of the third semiconductor light-emitting element forward of the vehicle. A rearward focal point of the projection lens 64 is structured so as to generally coincide with the light-emitting portion of the third semiconductor light-emitting element (see FIG. 1). Accordingly, light radiated from the light-emitting portion of the third semiconductor light-emitting element is directly incident to the projection lens 64 and such incident light is projected forward along an optical axis as generally parallel light. In other words, the third unit 60 in one or more embodiments is structured as a direct projector type of light source unit.

In one or more embodiments as shown in FIG. 4, brightness decreasing element 28 is provided on the reflective surface 27 of the first main reflector 26 in the sub-unit 20B of the first unit 20. The brightness decreasing element 28 is an embossed structure provided on both right and left end portions of the reflective surface 27. Light is radiated from the light-emitting portion 22a of the first semiconductor light-emitting element 22 and reflected by the brightness decreasing means 28 of the first main reflector 26. Such light becomes diff-used light with reduced brightness.

Note that although in one or more embodiments the brightness decreasing element 28 is an embossed structure, the brightness decreasing element 28 may also be a knurled or other structure such as a low-reflection coating.

Figure 5:
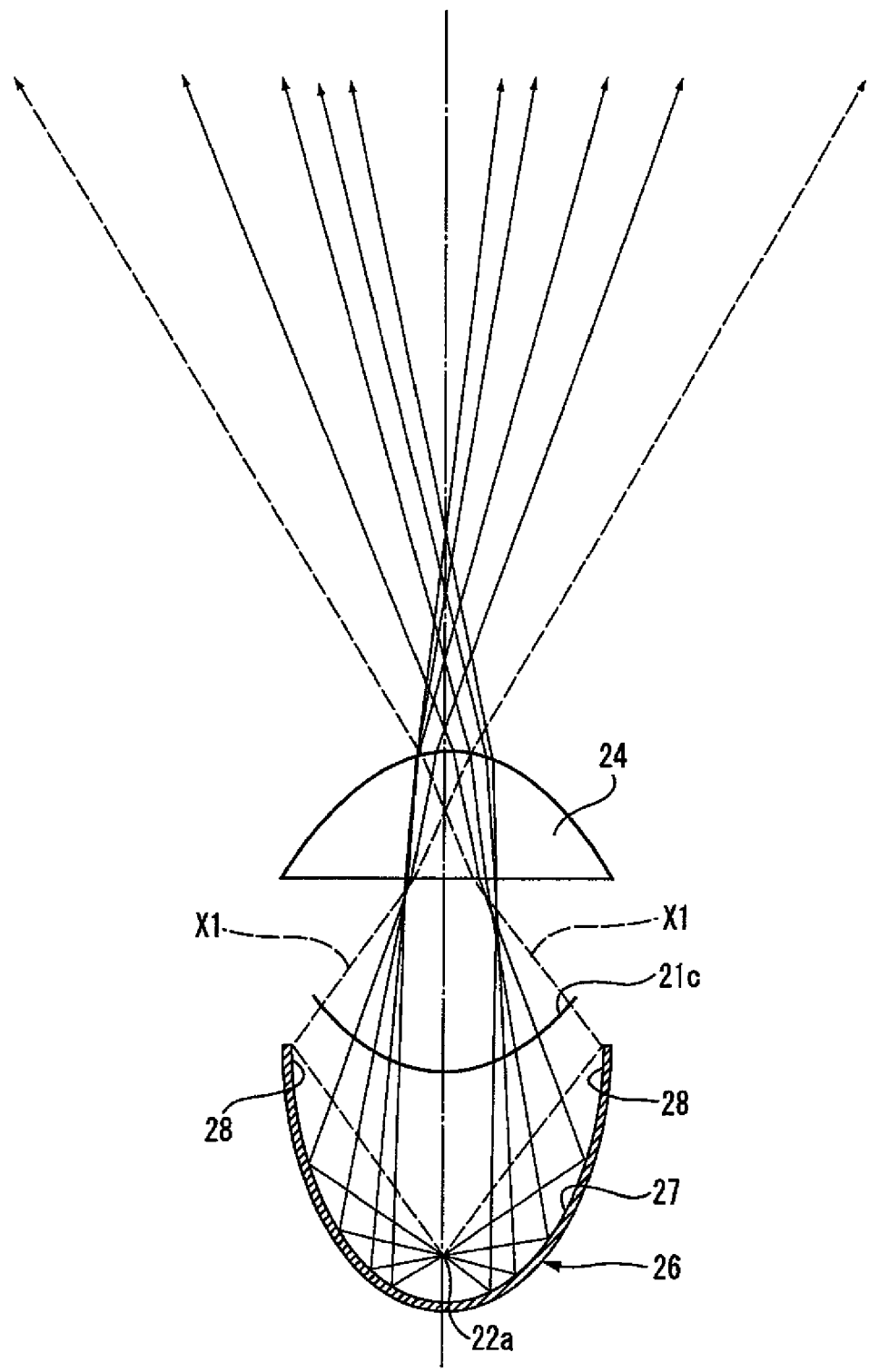
FIG. 5 is a ray trace view on a horizontal cross section of the sub unit 20B shown in FIG. 1.

Here, as shown in FIGS. 5 and 6, light L1 reflected by both the right and left end portions of the reflective surface 27 of the first main reflector 26 in the sub unit 20B forms a border at both the right and left end sides of a peripheral end portion of the cut-off line forming pattern Pa, which is formed by the sub unit 20B, that upwardly overlaps with a portion of the diffusion area forming pattern Pc.

Hence, as shown in FIG. 6, for the low-beam distribution pattern PL formed by the first unit 20 and the second unit 40, among the peripheral end portion of the cut-off line forming pattern Pa formed by the sub unit 20B, a low luminance portion W with a partially reduced brightness is formed at the border of both the right and left end sides that upwardly overlap with a portion of the diffusion area forming pattern Pc.

Accordingly, this results in reduced brightness of the peripheral end portion on both the right and left sides of the cut-off line forming pattern Pa upwardly overlapping with the diffusion area forming pattern Pc. Therefore, the boundary becomes less conspicuous and improves visibility for the driver.

In addition, the first unit 20 of one or more embodiments has a structure including the projection lens 24, which is disposed in front of the reflector 26 and projects light reflected by the reflective surface 27 of the reflector 26 forward of the vehicle. When the respective light distribution patterns formed by the sub-units 20A, 20B, 20C are synthesized, the light distribution pattern projected by the projection lens 24 increases in brightness near the center thereof. Therefore, near the center, the boundary of a portion overlapping with other patterns is not conspicuous. Hence, the brightness decreasing element 28 in one or more embodiments may be provided only on both the right and left end portions of the reflective surface 27 of the reflector 26, and it is possible to easily make less conspicuous the boundary of the peripheral end portion on both the right and left end sides of the cut-off line forming pattern Pa upwardly overlapping with the diffusion area forming pattern Pc. Naturally, depending on the structure of the lamp unit, the brightness decreasing element 28 may be provided along a front end portion of the reflective surface 27 of the reflector 26, and it is possible to easily make less conspicuous the entire boundary of the peripheral end portion on the cut-off line forming pattern Pa upwardly overlapping with the diffusion area forming pattern Pc.

Note that for the vehicular lamp 10 of one or more embodiments, the first light source of the first unit 20 and the second light source of the second unit 40 are structured by the first semiconductor light-emitting element 22 and the second semiconductor light-emitting element 42, respectively. By thus employing the semiconductor light-emitting elements 22, 42 that are generally compact light-emitting diodes (LEDs) with low power consumption as the light sources of the vehicular lamp 10, the effective use of limited power is possible. The first light source, the second light source, and the third light source of the vehicular lamp according to the present invention may also use a halogen bulb or a discharge bulb such as a metal halide bulb that employs a discharge light-emitting portion as a light source.

In addition, the first unit 20 and the second unit 40 in one or more embodiments are disposed such that the attachment surface 22b of the first semiconductor light-emitting element 22 and the attachment surface 42b of the second semiconductor light-emitting element 42 face each other. As a consequence, a set space is required for placing a substrate and the like. Normally, the attachment surface 22b side of the semiconductor light-emitting element 22 and the attachment surface 42b side of the second semiconductor light-emitting element 42, which do not emit light, are arranged facing each other and a space portion thereof emits light via an auxiliary optical unit 50. Thus, it is possible to efficiently arrange the first unit 20 and the second unit 40.

Figure 7:
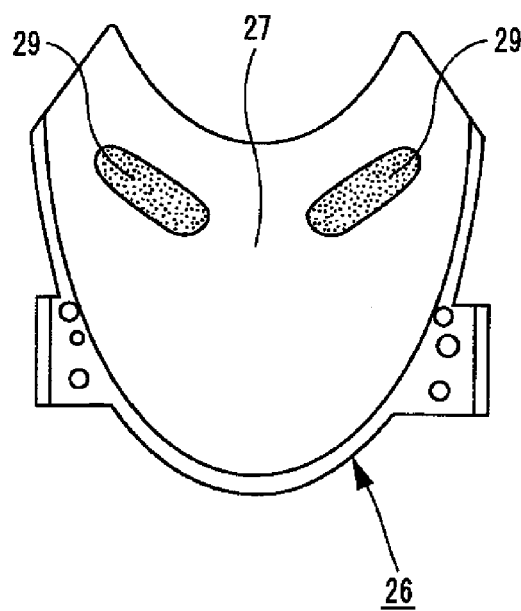
FIG. 7 is a bottom surface view of a reflector in a sub unit 20B according to another embodiment.

Note that the structures of the reflector, the projection lens, the lamp unit, the brightness decreasing element and the like according to the vehicular lamp of the present invention are not particularly limited to the structures described in the above embodiments; various modes are naturally conceivable based on the scope of the present invention. For example, as shown in FIG. 7, brightness increasing element 29 may also be provided on the reflective surface 27 of the first main reflector 26 in the sub-unit 20C of the first unit 20. The brightness increasing element 29 may be a high-reflection coating or other structure provided on right and left intermediate portions of the reflective surface 27. Light is radiated from the light-emitting portion 22a of the first semiconductor light-emitting element 22 and reflected by the brightness increasing element 29 of the first main reflector 26. Such light is reflected at a higher reflectivity rate than other portions of the reflective surface 27 and has partially increased brightness.

Figure 8:
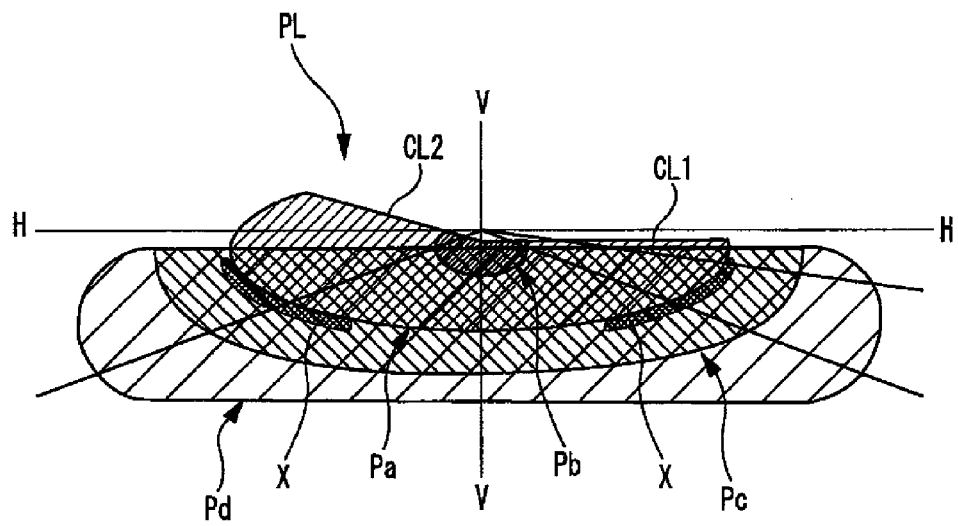
FIG. 8 is a view transparently showing low-beam distribution patterns formed by light that is radiated from a vehicular lamp provided with the reflector of the sub unit 20B shown in FIG. 7 onto a virtual vertical screen positioned 25 meters in front of the lamp.
Figure 9:
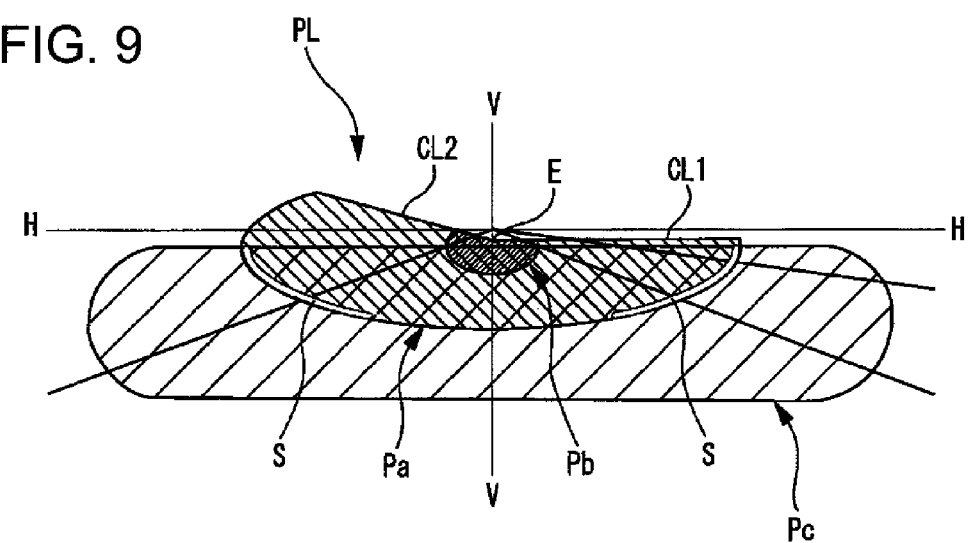
FIG. 9 is a view transparently showing low-beam distribution patterns formed by light that is radiated from a conventional vehicular lamp onto a virtual vertical screen positioned 25 meters in front of the lamp.

Here, as shown in FIG. 8, light reflected by the brightness increasing element 29 of the reflective surface 27 of the first main reflector 26 in the sub-unit 20C forms a border at the right and left intermediate portions among the diffusion area forming pattern Pc, which is formed by the sub unit 20C, in the outer side vicinity of a portion that downwardly overlaps with a peripheral end portion of the cut-off line forming pattern Pa.

Hence, for the low-beam distribution pattern PL formed by the first unit 20 and the second unit 40, among the diffusion area forming pattern Pc formed by the sub-unit 20C, a high luminance portion X with a partially increased brightness is formed at the border of the right and left intermediate portions in the outer side vicinity of a portion that downwardly overlaps with the peripheral end portion of the cut-off line forming pattern Pa.

Accordingly, this results in increased brightness of the right and left intermediate portions of the diffusion area forming pattern Pc in the outer side vicinity of a portion downwardly overlapping with the peripheral end portion of the cut-off line forming pattern Pa. Therefore, the boundary becomes less conspicuous and improves visibility for the driver.

It should be noted that the vehicular lamp according to the above embodiments illustrates an example where light distribution patterns with respectively different shapes are combined to form a synthesized light distribution pattern. However, light distribution patterns with set shapes, illumination positions and angles can be considered "different light distribution patterns" in the present invention if the illumination positions are different, for example, regardless of whether the shapes are identical. In other words, even when light distribution patterns with the same shape are irradiated at different positions to form a synthesized light distribution pattern, the contrast between light and dark at the boundary of mutually overlapping portions must be softened and made inconspicuous.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

10 VEHICULAR LAMP
12 TRANSLUCENT COVER
14 LAMP BODY
15 SUPPORT MEMBER
15a, 15b SUPPORT SURFACE
16 EXTENSION
20 FIRST UNIT
20A SUB UNIT
20B SUB UNIT
20C SUB UNIT
22 FIRST SEMICONDUCTOR LIGHT-EMITTING ELEMENT (FIRST LIGHT SOURCE)
22a LIGHT-EMITTING PORTION
22b ATTACHMENT SURFACE
26 FIRST MAIN REFLECTOR
27 REFLECTIVE SURFACE
28 BRIGHTNESS DECREASING ELEMENT
29 BRIGHTNESS INCREASING ELEMENT
40 SECOND UNIT
42 SECOND SEMICONDUCTOR LIGHT-EMITTING ELEMENT (SECOND LIGHT SOURCE)
42a LIGHT-EMITTING PORTION
42b ATTACHMENT SURFACE
46 SECOND MAIN REFLECTOR
W LOW LUMINANCE PORTION
X HIGH LUMINANCE PORTION

What is claimed is:

1. A vehicular lamp that combines light radiated from a plurality of lamp units to form a predetermined light distribution pattern, the vehicular lamp comprising:
   at least one lamp unit among the plurality of lamp units that comprises a reflector having a brightness decreasing means and forms a light distribution pattern different from that of another among the plurality of lamp units, wherein, the brightness decreasing means partially reduces, among peripheral end portions of light distribution patterns formed by the respective lamp units, a brightness of a portion upwardly overlapping with another pattern.

2. The vehicular lamp according to claim 1, wherein the lamp unit with the partially reduced brightness includes a projection lens that is disposed in front of the reflector and projects light reflected by the reflector forward of a vehicle, and the brightness decreasing means is provided on both right and left end portions of the reflective surface of the reflector.

3. A vehicular lamp comprising:

a plurality of lamp units that radiate light to respectively form predetermined light distribution patterns;

wherein at least one lamp unit among the plurality of lamp units comprises a reflector having at least one of a brightness increasing means and a brightness decreasing means; and forms a light distribution pattern different from that of another among the plurality of lamp units, and wherein the at least one lamp unit among the plurality of lamp units changes change a brightness of a portion of the light distribution pattern formed thereby at a position overlapping the light distribution pattern formed by another lamp unit among the plurality of lamp units.

4. The vehicular lamp according to claim 3, wherein among peripheral end portions of light distribution patterns formed by the respective lamp units, a brightness of a portion upwardly overlapping with another pattern is partially reduced.

5. The vehicular lamp according to claim 3, wherein among light distribution patterns formed by the respective lamp units, a brightness of a portion in an outer side vicinity of a portion downwardly overlapping with a peripheral end portion of another pattern is partially increased.

6. The vehicular lamp according to claim 4, wherein the reflector is provided respectively on each of the plurality of lamp units that reflects light from a light source forward, wherein the reflector comprises a reflective surface; and wherein on a lamp unit with a partially reduced brightness at a portion upwardly overlapping with another pattern, the brightness changing means comprises a brightness decreasing element.

7. The vehicular lamp according to claim 6 further comprising:

a projection lens disposed in front of the reflector of the lamp unit with the partially reduced brightness and projects light reflected by the reflector forward of a vehicle, and wherein the brightness decreasing element is provided on both right and left end portions of the reflective surface of the reflector.

8. The vehicular lamp according to claim 4, wherein among light distribution patterns formed by the respective lamp units, a brightness of a portion in an outer side vicinity of a portion downwardly overlapping with a peripheral end portion of another pattern is partially increased.

9. A vehicular lamp comprising:

a first lamp unit comprising:

a first lamp light source that radiates light to form a first light distribution pattern; and a first lamp reflector comprising a reflective surface that reflects light from the first lamp light source forward;

a second lamp unit comprising:

a second lamp light source that radiates light to form a second light distribution pattern;

a second lamp reflector comprising a reflective surface that reflects light from the second lamp light source forward; and a brightness decreasing element provided on the reflective surface of the second lamp reflector, wherein the first light distribution pattern and the second light distribution pattern combine to form a predetermined light distribution pattern, and wherein among peripheral end portions of the first light distribution pattern and the second light distribution pattern, a brightness of a portion of the second light distribution pattern upwardly overlapping with the first light distribution pattern is partially reduced by the brightness decreasing element.

10. The vehicular lamp according to claim 9, the first lamp unit further comprising:

a brightness increasing element provided on the reflective surface of the first lamp reflector, wherein a portion in an outer side vicinity of a portion downwardly overlapping with a peripheral end portion of another pattern is partially increased by the brightness increasing element.

11. The vehicular lamp according to claim 9, wherein the brightness decreasing element is formed on both right and left end portions of the reflective surface of the second lamp reflector.

12. The vehicular lamp according to claim 10, wherein the brightness increasing element is formed on right and left intermediate portions of the reflective surface of the first lamp reflector.

* * * * *